United States Patent Office 3,646,207
Patented Feb. 29, 1972

3,646,207
PHARMACEUTICAL COMPOSITIONS
Willem Soudyn, Turnhout, and Ineke van Wijngaarden, Beerse, Belgium, assignors to Janssen Pharmaceutica, N.V.
No Drawing. Filed Nov. 4, 1968, Ser. No. 773,324
Int. Cl. A61k 27/00
U.S. Cl. 424—266
11 Claims

ABSTRACT OF THE DISCLOSURE

Pharmaceutical compositions of a 4-phenylisonipecotic acid derivative having analgesic and anti-diarrheal activity.

---

This invention relates to pharmaceutical compositions, preferably in dosage unit form, containing 1-(3-cyano-3,3-diphenylpropyl)-4-phenylisonipecotic acid or a therapeutically active acid addition salt thereof as the active ingredient. It has been found that 1-(3-cyano-3,3-diphenylpropyl) - 4 - phenylisonipecotic acid possesses marked anti-diarrheal and analgesic activities.

To prepare the medicinal compositions of this invention, 1-(3-cyano-3,3-diphenylpropyl)-4-phenylisonipecotic acid or salt thereof is combined in intimate admixture with a pharmaceutical carrier, which carrier may take a wide variety of forms depending on the form of preparation desired for administration, i.e., oral or parenteral. In preparing the compositions in oral dosage form, any of the usual pharmaceutical media may be employed, such as, for example, water, glycols, oils, alcohols and the like in the case of oral liquid preparations such as suspensions, elixirs and solutions; or solid carriers such as starches, sugars, kaolin, lubricants, binders, disintegrating agents and the like in the case of powders, capsules and tablets. Because of their ease in administration, tablets and capsules represent the most advantageous oral dosage form, in which case solid pharmaceutical carriers are obviously employed. For parenteral injection, the carrier will usually comprise sterile water, at least in large part, though other ingredients, for example, to aid solubility, may be included. Injectable solutions, for example, may be prepared in which the carrier comprises saline solution, glucose solution or a mixture of saline and glucose solution. Injectable suspensions may also be prepared in which case appropriate liquid carriers, suspending agents and the like may be employed. Generally, the compositions per dosage unit, e.g., tablet, capsule, injection, teaspoonful, powder and the like, will contain at least from about 0.1 mg. to about 25 mg. of the active ingredient.

1-(3-cyano - 3,3 - diphenylpropyl)-4-phenylisonipecotic acid and the pharmaceutically acceptable acid addition salts thereof are highly active inhibitors of gastro-intestinal propulsion and defecation and are therefore useful in the treatment of diarrhea. The anti-diarrheal activity of such compounds has been observed in experimental animals, for example, according to the following test procedures. Young female Wistar rats (230–250 g. body weight) are fasted overnight and in the morning each animal is treated orally with a dose level (40, 20, 10, 5, 2.5, 1.25, 0.63, 0.31, 0.16, 0.08, 0.04 mg./kg.) of the compound to be tested (10 ml./kg.). One hour thereafter, the animal receives 1 ml. of ricinus oil orally. Each animal is kept in an individual cage. At different time intervals (1, 2, 3, 4, 6 and 8 hrs.) after the ricinus oil treatment, the presence or absence of diarrhea is noted. In more than 95% of 250 control animals, severe diarrhea is observed 1 hour after treatment with ricinus oil. Using this all-or-none criterium, a significant positive effect occurs with the tested compound if no diarrhea is observed 1 hour after the ricinus oil treatment in at least two out of ten rats per dose level [=lowest effective dose (LED) in mg./kg. orally]. A minimum of 5 dose levels are used per drug, each dose level being given to 10 rats on ten different days. For example, according to this procedure, the preferred compound herein, 1-(3-cyano-3,3-diphenylpropyl)-4-phenylisonipecotic acid hydrochloride, is found to have an LED of 0.02 mg./kg. orally.

In addition to anti-diarrheal activity, the subject compounds also possess morphine-like analgesic activity, as demonstrated in the rat tail withdrawal test described in Arzneimittel-Forschung 13, 502 (1963). According to this procedure, the LED of 1-(3-cyano-3,3-diphenylpropyl)-4-phenylisonipecotic acid hydrochloride is about 2.5 mg./kg. orally.

The following examples are intended to illustrate, but not to limit, the scope of the present invention.

EXAMPLE I

To a stirred solution of 5.52 parts of tert.-potassium butanolate in 60 parts of dimethylsulfoxide are added 1.7 parts of ethyl 1-(3-cyano-3,3-diphenylpropyl)-4-phenylisonipecotate hydrochloride and the whole is stirred on an oil-bath (90° C.) for 4 hours. The reaction mixture is cooled (30° C.) and poured onto 180 parts of water with stirring. After two extractions with benzene, the aqueous phase is acidified with glacial acetic acid to pH 6.5 with stirring. The precipitated product is filtered off, washed with water, dried, dissolved in 50 parts of 0.4 N potassium hydroxide and precipitated again with glacial acetic acid. The crude free base is filtered off and dissolved in a mixture of 2-propanol and chloroform and gaseous hydrogen chloride is introduced into the solution. The whole is filtered and the filtrate is evaporated. The residue is mixed with benzene and the latter is evaporated again. The residue is recrystallized from 2-propanol, yielding 1-(3-cyano-3,3-diphenylpropyl)-4-phenylisonipecotic acid hydrochloride.

EXAMPLE II 10,000 hard gelatin capsules, each containing as the active ingredient (A.I.) 2.5 milligrams of 1-(3-cyano-3,3-diphenylpropyl)-4-phenylisonipecotic acid hydrochloride, are prepared from the following formulation:

|  | Grams |
|---|---|
| A.I. | 25 |
| Lactose | 965 |
| Starch | 250 |
| Talc | 250 |
| Calcium stearate | 10 |

A uniform mixture of the active and supplementary ingredients is prepared and filled into two-piece hard gelatin capsules.

EXAMPLE III—Tables 5,000 compressed tablets, each containing as the active ingredient 5 milligrams of 1-(3-cyano-3,3-diphenylpropyl)-4-phenylisonipecotic acid hydrochloride are prepared from the following formulation:

|  | Grams |
|---|---|
| A.I. | 25 |
| Starch | 72.5 |
| Dibasic calcium phosphate hydrous | 500 |
| Calcium stearate | 2.5 |

The finely powdered ingredients are mixed well and granulated with 10% starch paste. The granulation is dried and compressed into tablets using starch as a disintegrant and calcium stearate as a lubricant.

EXAMPLE IV—Injectable

The following formulation provides 1 liter of a parenteral suspension comprising 1 mg. of 1-(3-cyano-3,3- diphenylpropyl)-4-phenylisonipecotic acid hydrochloride as the active ingredient per milliliter:

| | Grams |
|---|---|
| A.I. | 1.0 |
| Polysorbate 80 | 2.0 |
| Sodium chloride | 9.0 |
| Sodium carboxymethyl cellulose | 10.0 |
| Methyl paraben | 1.8 |
| Propyl paraben | 0.2 |
| Water for injection, U.S.P., q.s. ad 1 liter. | |

Dissolve the parabens, sodium chloride and carboxymethyl cellulose in ½ the total volume of water by heating to 95° C. to obtain a clear solution. Filter and autoclave. Dissolve the polysorbate in ⅓ the total volume of water. Filter and autoclave this second solution. Add sterile A.I. to the second solution and pass through a sterile colloid mill. To the resulting suspension, add the first solution with uniform stirring. Q.s. with water and stir while filling into sterile vials.

EXAMPLE V—Oral suspension

The following formulation provides 5 liters of an oral suspension comprising 0.5 mg. of 1-(3-cyano-3,3-diphenylpropyl)-4-phenylisonipecotic acid hydrochloride as the active ingredient per teaspoonful (5 mls.):

| | Grams |
|---|---|
| A.I. | 0.5 |
| Sucrose | 300.0 |
| Dioctyl sodium sulfosuccinate | 0.5 |
| Bentonite | 22.5 |
| Methyl paraben | 7.5 |
| Propyl paraben | 1.5 |
| Antifoam A.F. Emulsion | 0.15 |
| Propylene glycol | 52.0 |
| FD&C Yellow #5 | 0.1 |
| Sodium cyclamate | 50.0 |
| Sodium saccharin | 5.0 |
| Orange flavor | 7.5 |
| Filtered purified water, q.s. ad 5 liters. | |

Dissolve the parabens in the propylene glycol and add this solution to a solution of the sodium cyclamate, sodium saccharin and sucrose in half the water. Suspend the bentonite in hot (about 85° C.) water and stir for 60 minutes. Add the bentonite solution to the former solution.

Dissolve the sulfosuccinate in some water and suspend the A.I. in the resulting solution. Add the antifoam A.F. emulsion which has been diluted to a lotion consistency with a minimum amount of water and mix well.

Add the latter suspension of A.I. to the former mixture and mix well. Add the FD & C Yellow #5 dissolved in a small amount of water. Add the orange flavor, q.s. to volume with water, and stir to a homogeneous mixture. Pass the mixture through a colloid mill and fill into suitable containers.

What is claimed is:

1. A pharmaceutical composition in dosage unit form comprising an effective amount to inhibit gastrointestinal propulsion of a member selected from the group consisting of 1-(3-cyano-3,3-diphenylpropyl)-4-phenylisonipecotic acid and the therapeutically active acid addition salts thereof as an active ingredient admixed with a pharmaceutical carrier.

2. A pharmaceutical composition in dosage unit form comprising per dosage unit from about 0.1 to about 25 mg. of a member selected from the group consisting of 1-(3-cyano-3,3-diphenylpropyl)-4-phenylisonipecotic acid and the therapeutically active acid addition salts thereof as an active ingredient in admixture with a solid pharmaceutical carrier.

3. Claim 2 wherein said active ingredient is 1-(3-cyano-3,3-diphenylpropyl)-4-phenylisonipecotic acid hydrochloride.

4. Claim 2 wherein said dosage unit form is a tablet.

5. Claim 2 wherein said dosage unit form is a capsule.

6. A liquid pharmaceutical composition comprising from about 0.1 mg. to about 25 mg. per dosage unit of a member selected from the group consisting of 1-(3-cyano-3,3-diphenylpropyl)-4-phenylisonipecotic acid and the therapeutically active acid addition salts thereof as an active ingredient in a liquid medium suitable for oral administration.

7. Claim 6 wherein said active ingredient is 1-(3-cyano-3,3-diphenylpropyl)-4-phenylisonipecotic acid hydrochloride.

8. An injectable pharmaceutical composition comprising from about 0.1 to 25 mg. per dosage unit of a member selected from the group consisting of 1-(3-cyano-3,3-diphenylpropyl)-4-phenylisonipecotic acid and the therapeutically active acid addition salts thereof as an active ingredient in a liquid medium suitable for parenteral administration.

9. Claim 8 wherein said active ingredient is 1-(3-cyano-3,3-diphenylpropyl)-4-phenylisonipecotic acid hydrochloride.

10. The method of inhibiting gastro-intestinal propulsion which comprises internally administering to a warm blooded animal a pharmaceutical composition in dosage unit form comprising per dosage unit from about 0.1 to about 25 mg. of a member selected from the group consisting of 1-(3-cyano-3,3-diphenylpropyl)-4-phenylisonipecotic acid and the therapeutically active acid addition salts thereof as an active ingredient in admixture with a pharmaceutical carrier.

11. The method of claim 10 wherein said active ingredient is 1-(3-cyano-3,3-diphenylpropyl)-4-phenylisonipecotic acid hydrochloride.

References Cited

UNITED STATES PATENTS 2,898,340   8/1959   Janssen _____ 260—294.3

OTHER REFERENCES

Physician's Desk Reference, 1967, pages 879, 1045 and 1046.

STANLEY J. FRIEDMAN, Primary Examiner

A. J. ROBINSON, Assistant Examiner